United States Patent
Mevissen et al.

(10) Patent No.: US 7,624,852 B2
(45) Date of Patent: Dec. 1, 2009

(54) CRANKSHAFT DECOUPLER

(75) Inventors: Bert Mevissen, Nobleton (CA); James W. Dell, Aurora (CA); John R. Antchak, Innisfil (CA)

(73) Assignee: Litens Automotive Partnership, Woodbridge, Ontaro (CA)

( * ) Notice: Subject to any disclaimer, the term of this patent is extended or adjusted under 35 U.S.C. 154(b) by 155 days.

(21) Appl. No.: 10/572,128

(22) PCT Filed: Sep. 22, 2004

(86) PCT No.: PCT/CA2004/001696

§ 371 (c)(1),
(2), (4) Date: Mar. 16, 2006

(87) PCT Pub. No.: WO2005/028899

PCT Pub. Date: Mar. 31, 2005

(65) Prior Publication Data

US 2007/0037644 A1  Feb. 15, 2007

Related U.S. Application Data

(60) Provisional application No. 60/504,934, filed on Sep. 22, 2003.

(51) Int. Cl.
*F16D 47/02* (2006.01)
*F16D 41/20* (2006.01)

(52) U.S. Cl. ............... 192/41 S; 192/55.61; 192/81 C; 474/94

(58) Field of Classification Search .............. 192/55.61
See application file for complete search history.

(56) References Cited

U.S. PATENT DOCUMENTS

| | | | |
|---|---|---|---|
| 3,081,856 A * | 3/1963 | Wolfram et al. | 192/104 R |
| 6,044,943 A | 4/2000 | Bytzek et al. | |
| 6,083,130 A | 7/2000 | Mevissen et al. | |
| 6,394,248 B1 | 5/2002 | Monahan et al. | |
| 6,761,656 B2 | 7/2004 | King et al. | |
| 2006/0144664 A1 * | 7/2006 | Antchak et al. | 192/41 S |

* cited by examiner

*Primary Examiner*—Richard M. Lorence
(74) *Attorney, Agent, or Firm*—ClarkHill PLC

(57) ABSTRACT

A decoupler assembly (20) is provided for transferring rotational torque between a drive shaft (16) and a drive belt (18) of an automotive engine. The decoupler assembly includes a drive hub (40) configured to be fixedly secured to the drive shaft. A pulley (22) is rotatably coupled to the drive hub (40) and adapted to be drivingly engaged with the belt (18). A spring shell (70, 100) is operatively coupled between the drive hub and the pulley for selective rotation therewith and a biasing member (130) is operatively coupled between the spring shell and the drive hub for isolating oscillatory vibrations between the drive hub and the pulley caused by rotation of the drive shaft. A clutch element (140) is seated between the spring shell (70, 100) and the pulley (22) for selectively transferring rotational torque from the drive hub to the pulley. The pulley (22) includes an inner clutch surface (26) and the clutch element includes a plurality of coils in frictional engagement with the inner clutch surface and an end coupled to the spring shell for expanding the coils against the inner clutch surface upon rotation of the spring shell with the drive hub to selectively transfer torque between the drive hub (40) and the pulley (22).

22 Claims, 10 Drawing Sheets

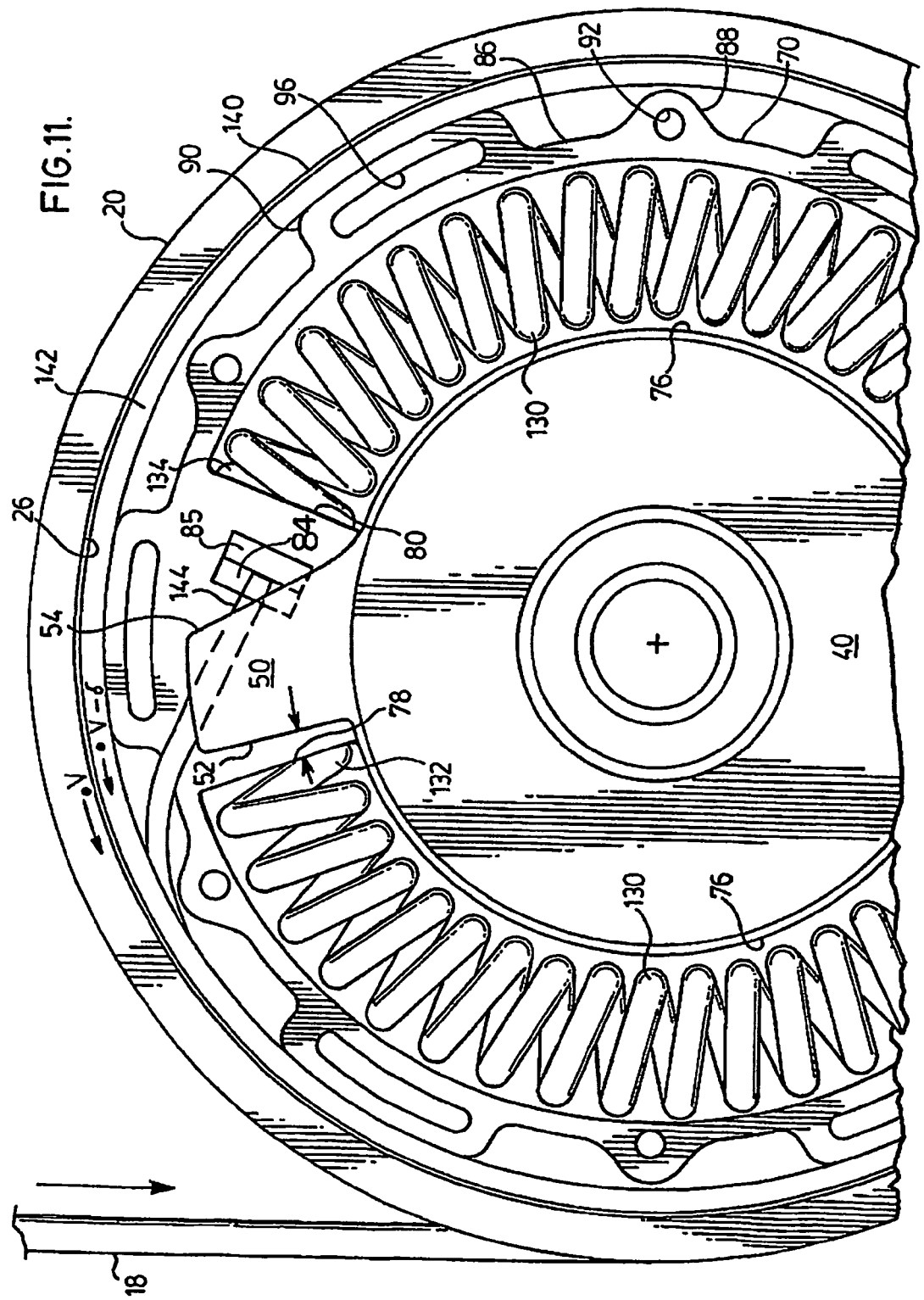

CRANKSHAFT DECOUPLER

This application is a 371 of PCT application CA04/01696 filed Sep. 22, 2004 which claims benefit of U.S. provisional application 60/504,934 filed Sep. 22, 2003.

BACKGROUND OF THE INVENTION

The invention relates to a crankshaft and drive assembly of an automotive vehicle, and more particularly, to a decoupling assembly that allows the drive assembly to overrun or operate temporarily at a speed different from that of the crankshaft and to decouple or mechanically isolate the drive assembly from the crankshaft and reduce torsional vibrations therebetween.

DESCRIPTION OF THE RELATED ART

It is widely known in an automotive vehicle engine to transfer a portion of the engine output to a plurality of belt driven accessory components utilizing an endless serpentine belt. Typically, each belt driven accessory component includes a pulley drivingly engaged with the belt and the belt is driven by an output pulley coupled directly to the crankshaft.

Internal combustion engines operate as a pulse system, constantly accelerating and decelerating and causing engine vibrations. As a result of these changing speeds, the belt driven accessory components, which are driven by the crankshaft, are continually trying to speed up and slow down. This can result in unacceptable levels of noise and vibration along with reduced accessory drive component durability due to high fluctuating loads and vibrations. Additionally, rapid engine accelerations and deceleration, such as during transmission shifts and engine startup and shutdown, cause belt squeal from slippage between the belt and the pulley as well as heavy impact loading on the belt.

It is known to provide a decoupler assembly between the belt driven accessory component and the pulley to allow the belt driven accessory component to operate temporarily at a higher speed or "overrun" the pulley as the pulley oscillates with the speed of the engine. Examples of such decouplers are disclosed in the U.S. Pat. No. 6,083,130, issued to Mevissen et al. on Jul. 4, 2000 and the U.S. Pat. No. 5,139,463, issued to Bytzek et al. on Aug. 18, 1992.

It is also known to provide a decoupler assembly between the belt driven accessory and the pulley to isolate vibrations therebetween and allow overrunning, reducing noise and impact loads. An example of such a decoupler is disclosed in U.S. Pat. No. 6,044,943 issued to Bytzek et al. on Apr. 4, 2000.

However, it remains desirable to provide a decoupler assembly that is sufficiently durable to endure the frictional loads, allows the output pulley of the crankshaft to operate temporarily at a higher speed or "overrun" the crankshaft as the speed of the engine accelerates and decelerates, and decouples or isolates the torsional vibrations in the output pulley as the crankshaft oscillates during normal operation.

SUMMARY OF THE INVENTION

According to one aspect of the invention there is provided, a decoupler assembly for transferring rotational torque between a drive shaft and an endless drive element of an automotive engine. The decoupler assembly comprises a drive hub configured to be fixedly secured to the drive shaft. A pulley is rotatably mounted on the drive hub and adapted to be drivingly engaged with the endless drive element. A spring shell is operatively coupled between the drive hub and the pulley for selective rotation therewith. A biasing member elastically couples the spring shell and the drive hub isolating oscillatory vibrations therebetween. A clutch element is seated between the spring shell and the pulley selectively transferring rotational torque from the drive hub to the pulley and enabling overrunning of the pulley relative to the drive hub. The clutch element includes a plurality of helical coils in frictional engagement with the pulley and an end coupled to the spring shell. The clutch element expands against the pulley upon driving rotation of the drive hub relative to the spring shell selectively coupling the drive hub and the pulley.

BRIEF DESCRIPTION OF THE DRAWINGS

Advantages of the present invention will be readily appreciated as the same becomes better understood by reference to the following detailed description when considered in connection with the accompanying drawings wherein:

FIG. 11 is a plan view of the decoupler assembly decelerating for allowing the output pulley to overrun the drive hub.

DETAILED DESCRIPTION OF THE PREFERRED EMBODIMENT

Figure 1:
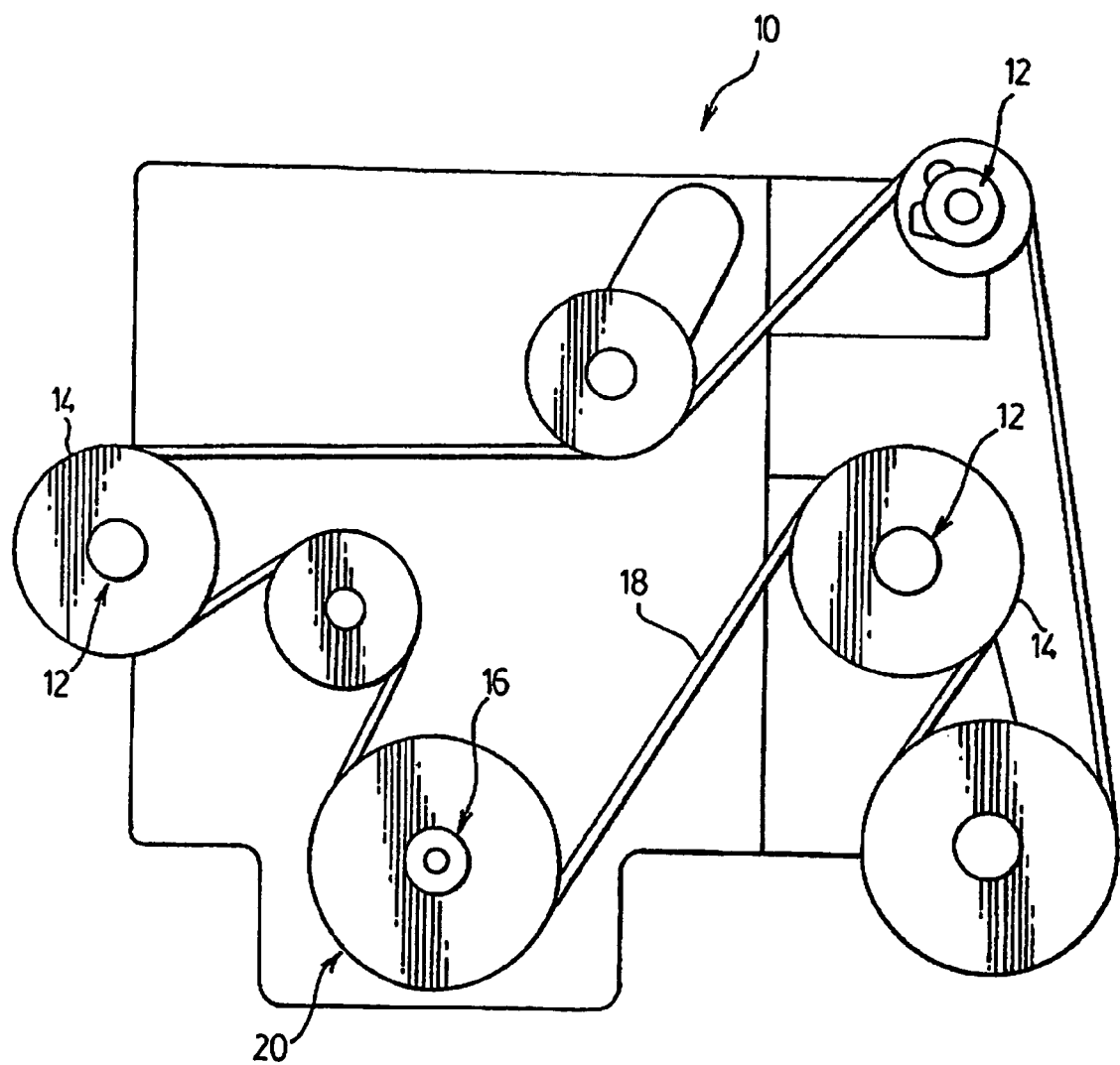
FIG. 1 is a front view of an engine of an automotive vehicle incorporating a decoupler assembly according to one aspect of the invention.

Referring to FIG. 1, an internal combustion engine for an automotive vehicle is generally indicated at 10. The engine 10 includes a plurality of belt driven accessory components 12, such as an alternator, compressor, etc. A pulley 14 is operatively coupled to each of the belt driven accessory components 12 for driving the components 12 via rotation of the pulley 14. The engine 10 also includes a crankshaft 16, which generally provides the mechanical torque output resulting from the operation of the engine 10. An endless serpentine belt 18 is seated about each pulley 14 of the belt driven accessory components 12. The belt 18 is driven in a driven direction by the rotation of the crankshaft 16, which causes rotation of the pulleys 14. A crankshaft torque modulator or decoupler assembly 20 is operatively coupled between the crankshaft 16 and the belt 18.

Figure 2:
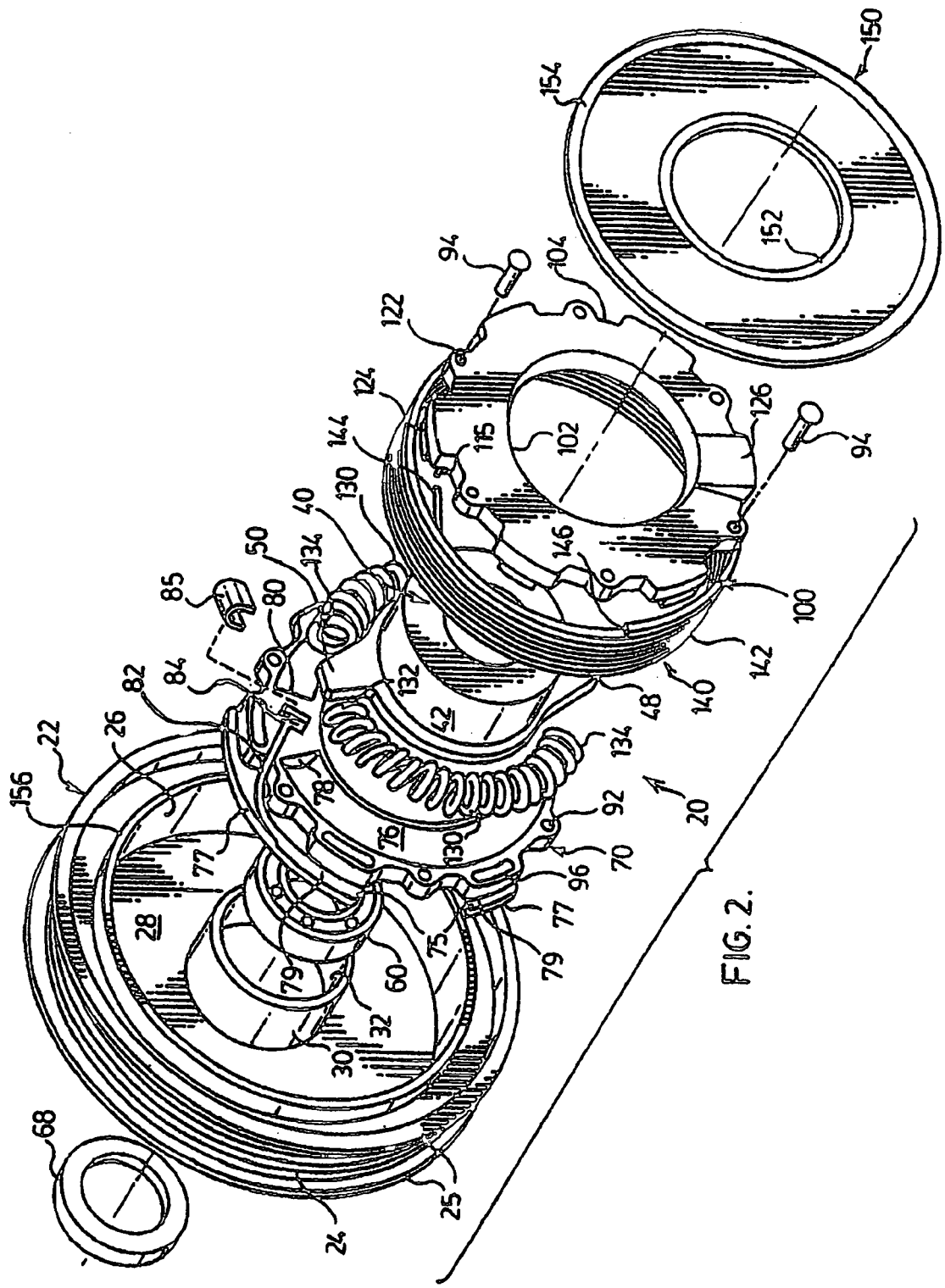
FIG. 2 is an exploded perspective view of the decoupler assembly.

Referring to FIG. 2, the decoupler assembly 20 is shown in an exploded view and includes an output pulley 22 having an annular outer track 24 defined between a pair of spaced apart, raised and parallel rims 25 that seats the belt 18 therein. The output pulley 22 also includes an annular inner clutch surface 26 opposite and generally concentric with the outer track 24. The output pulley 22 further includes a face plate 28 extending between the outer track 24 and the inner clutch surface 26. A hollow, cylindrical hub 30 projects axially from the center of the face plate 28 concentric with the inner clutch surface 26 for defining a hub bearing surface 32.

Figure 3:
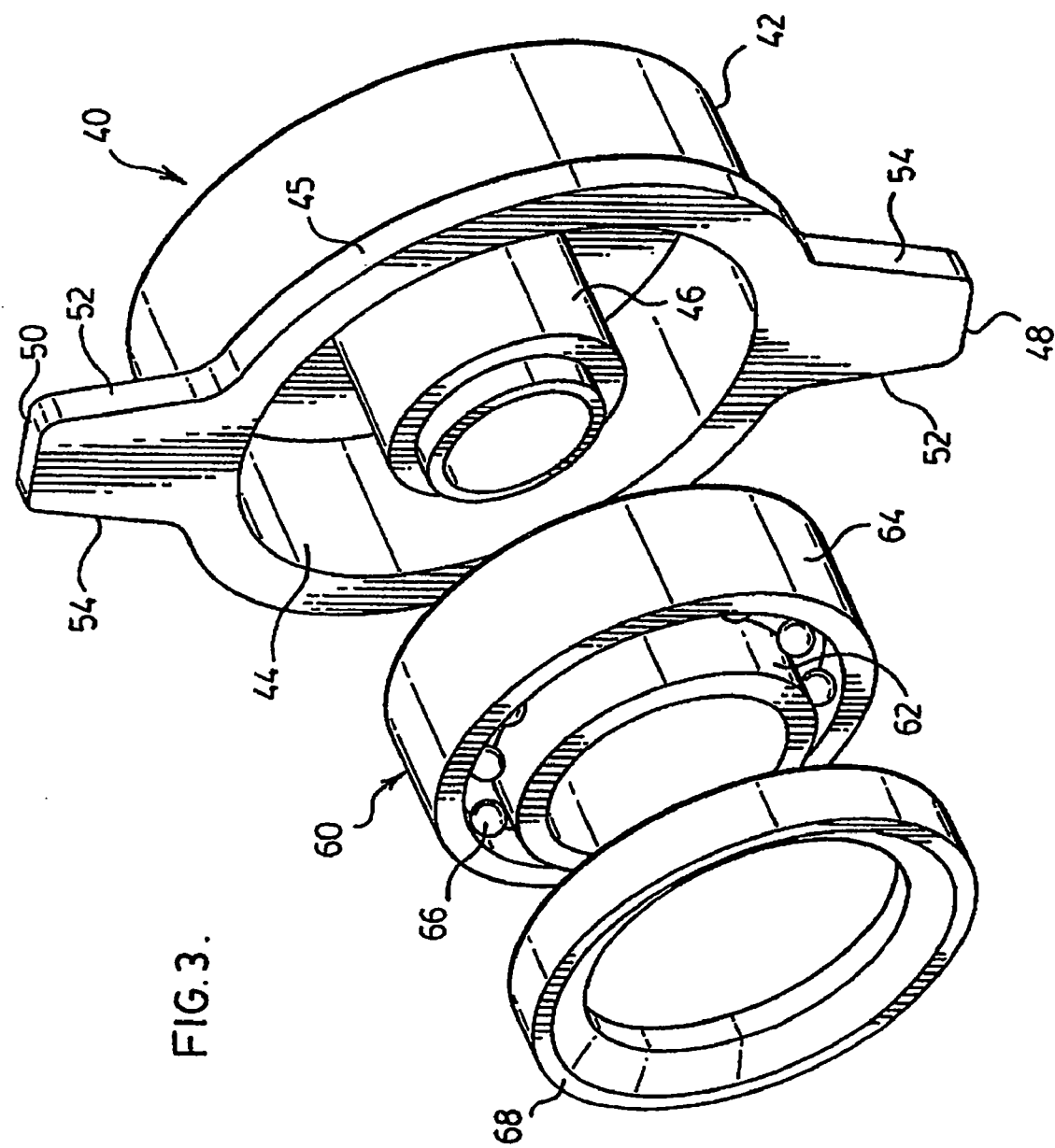
FIG. 3 is an exploded perspective view of the drive hub and bearing assembly of the decoupler assembly.
Figure 4:
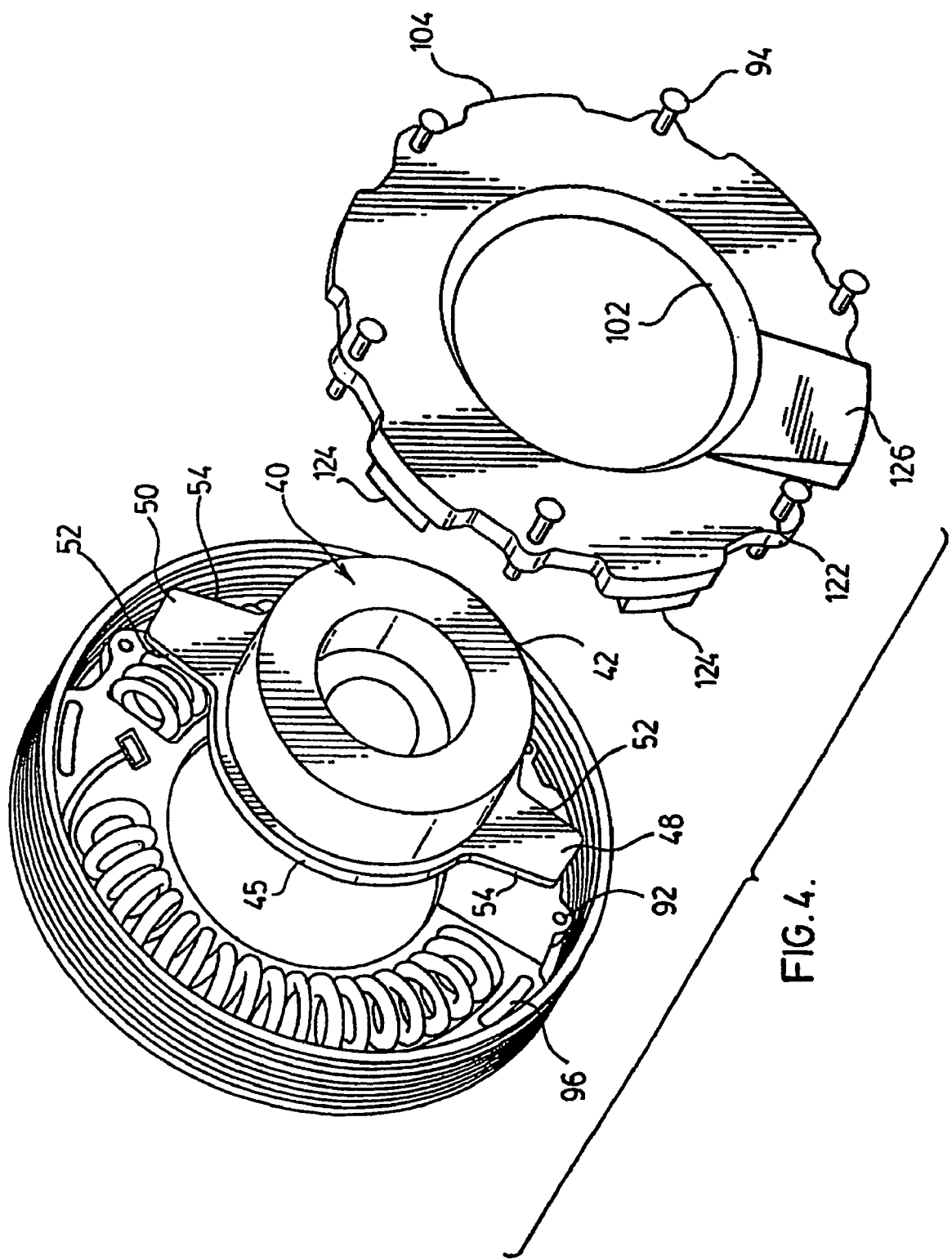
FIG. 4 is an exploded perspective view of the drive hub coupled between upper and lower spring shells and the clutch element of the decoupler assembly.
Figure 5:
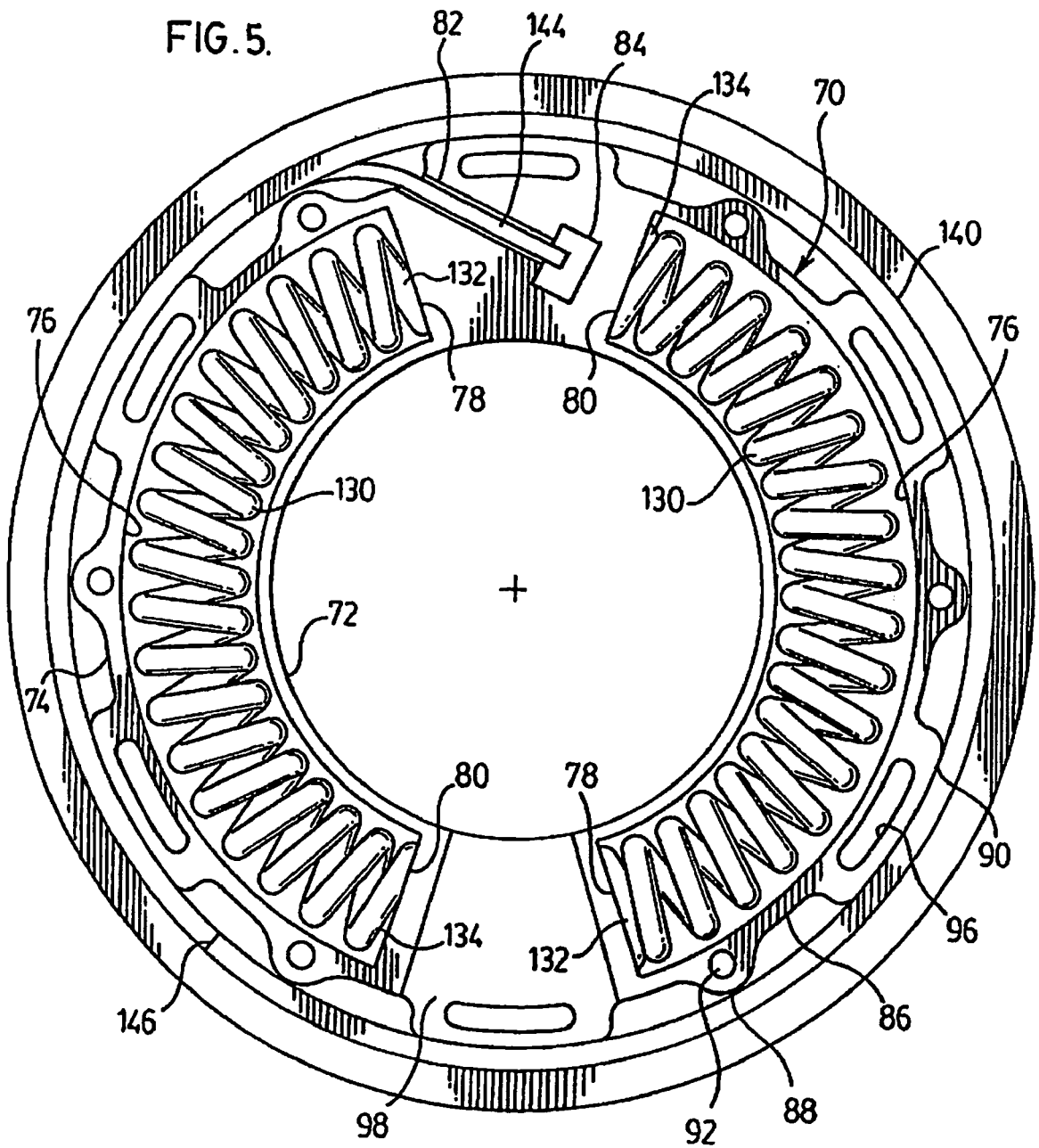
FIG. 5 is a plan view of the lower spring shell, biasing members and clutch element.
Figure 7:
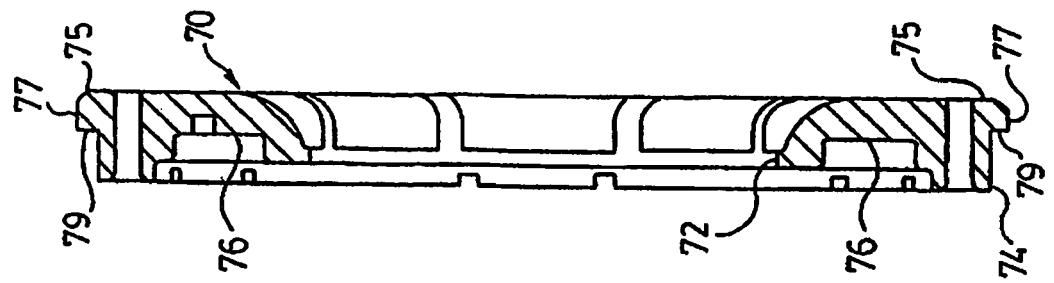
FIG. 7 is a cross-sectional view taken along line 7-7 of FIG. 6.
Figure 6:
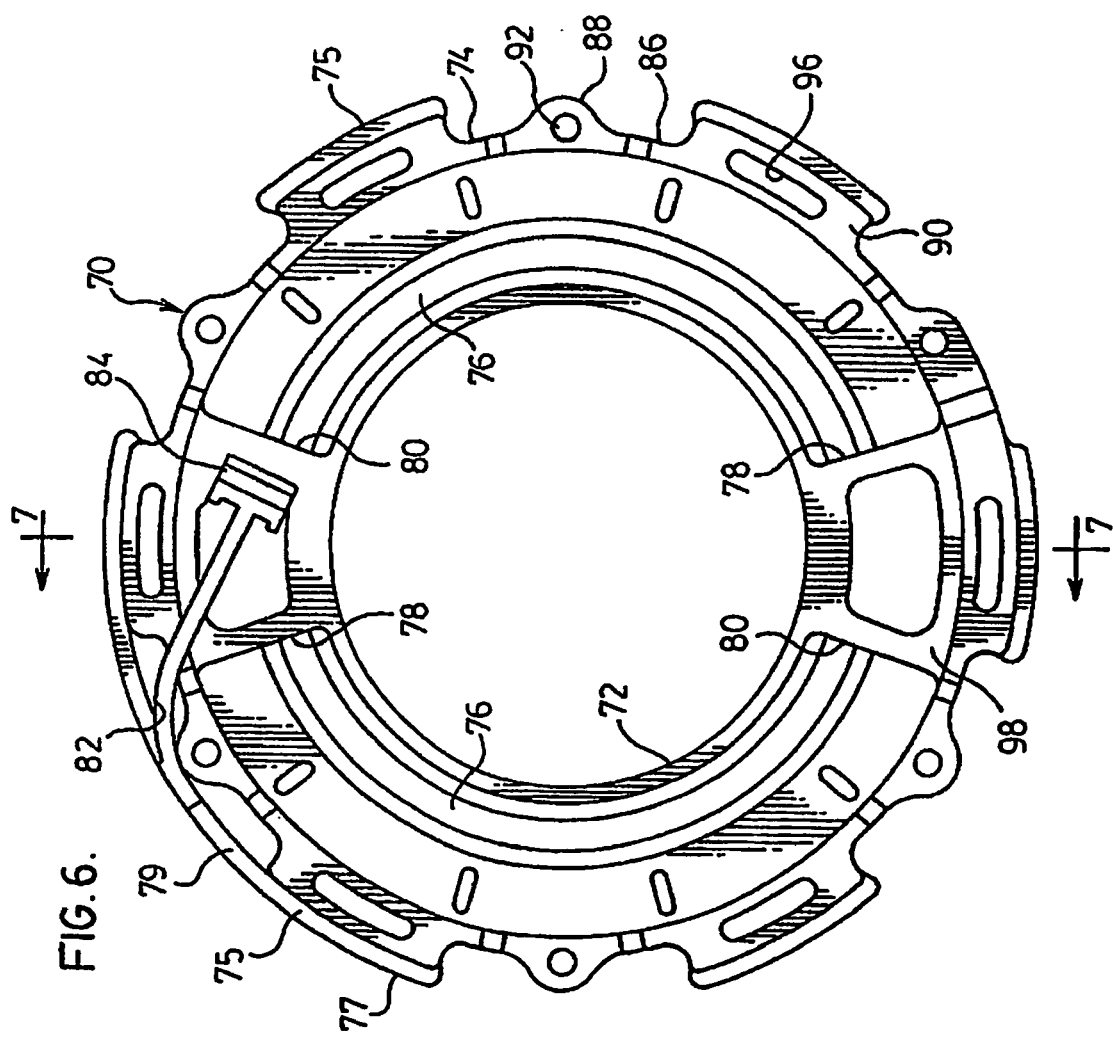
FIG. 6 is a plan view of the lower spring shell.

Referring to FIGS. 2-4, the decoupler assembly 20 also includes a drive hub 40, preferably formed of metal, fixedly secured to the crankshaft 16 by any suitable fastener or connection means for rotation therewith. The drive hub 40 includes a generally cup-shaped cylindrical main body 42 defining an inner surface 44 and having a circumferential radial rim 45. A bearing post 46 extends axially from the center of the main body 42 to a distal end. At least one, but preferably a plurality of tabs 48, 50 extends radially outwardly radial rim 45 of the main body 42. Each tab 48, 50 includes a leading edge 52 extending generally perpendicularly from the main body 42 and a trailing edge 54 extending angularly from the main body 42.

A bearing assembly 60 rotatably couples the output pulley 22 and the drive hub 40. The bearing assembly 60 includes a circular inner race 62 surrounding by a circular outer race 64. A plurality of ball bearings 66 are seated between the inner race 62 and outer race 64. The inner race 62 is seated around the bearing post 46 of the drive hub 40 and the outer race 64 is press fit against the bearing surface 32 of the output pulley 22 to provide the rotatable connection therebetween. In the preferred embodiment, the inner race 62 projects axially beyond the outer race 64 to form a shoulder to receive a disc-shaped seal 68 thereon to seal the ball bearings 66 between the inner race 62 and outer race 64 and to seal an oil or grease lubricant within the bearing assembly 60 and output pulley 22, as will be described in further detail herein below. However, the inner race 62 may be axial flush with the end of the outer race 64. In such case, the seal 68 may be seated around an extended collar portion of the bearing post 46 to seal against the ends of both the inner race 62 and outer race 64. The seal 68 may be separate or an integral part of the bearing assembly 60. Alternatively, a bushing can be used instead of the bearing assembly 60. Generally, the bushing would provide greater damping over the bearing assembly 60.

Referring to FIGS. 2, and 4-7, the decoupler assembly 20 further includes a lower spring shell 70 and an upper spring shell 100 operatively coupled to the drive hub 40. Each of the shells 70, 100 is preferably molded of an organic plastic material. The lower spring shell 70 is generally disc-shaped and extends between cylindrical and generally concentric inner and outer 74 for a shelf or shoulder and outer surfaces 72, 74. A radial rim element 75 projects radially from at least portions of the outer surface 74 forming a shelf or shoulder and outer peripheral bearing surface 77 for frictionally engaging and supporting the inner clutch surface 26 of the output pulley 22. The radial rim element 75 as shown in the preferred embodiment extends only along portions of the periphery of the outer surface to reduce the weight of the lower spring shell 70. However, it should be appreciated that the rim element 75 may be a contiguous circumferential rim extending around the entire periphery of the outer surface 74. Further, the radial rim element 75 increases in its axial thickness incrementally and continuously around the circumference of the outer surface 74 to form a helical contour or ramped support surface 79. At least one, but preferably a plurality of trenches 76 is formed and recessed in the lower spring shell 70 between the inner and outer surfaces 72, 74. Each trench 76 extends arcuately between a first end 78 and a second end 80. The trenches 76 are aligned end to end and arranged in a generally circular manner along the perimeter of the lower spring shell 70. A retaining slot 82 extends diagonally between the adjacent ends of the trenches 76 from the outer surface 74 to a generally rectangular cavity 84. An L-shaped or U-shaped blocking tab or clutch stop 85, preferably formed of stamped metal, is seated in the cavity 84. A plurality of cutouts 86 is formed in the outer surface 74 to reduce the weight of the lower spring shell 70 and to form a series of alternating undulations 88, 90 in the outer surface 74. Additionally, lubricant can be supported in the cutouts 86 for lubricating the inner clutch surface 26 of the output pulley 22. The undulations 88 each include a bore 92 therethrough for receiving a fastener 94, such as a rivet or screw, to fixedly secure the lower spring shell 70 to the upper spring shell 100. The undulations 90 each include an elongated slot 96 for aligning with and engaging with the upper spring shell 100 as will be further described below. Further, the lower spring shell 70 includes an enlarged counter-balance block 98 formed between the inner surface 72 and the outer surface 74 positioned radially opposite the retaining slot 82 and cavity 84 to rotationally balance the lower spring shell 70.

Figure 8:
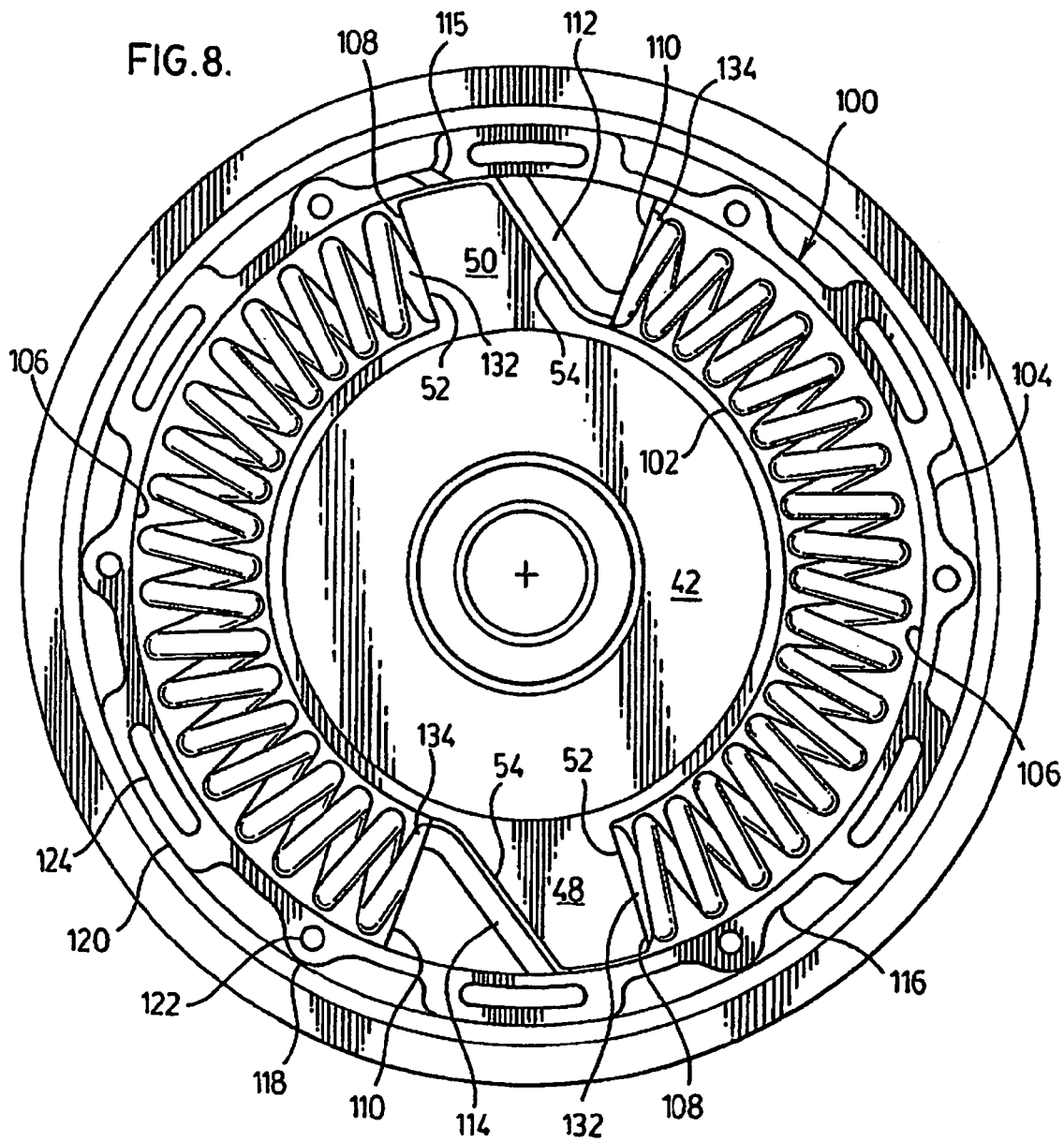
FIG. 8 is a plan view of the upper spring shell, biasing members and clutch element.

Referring to FIGS. 2, 4, and 8, the upper spring shell 100 is also generally disc-shaped and extends between cylindrical and generally concentric inner and outer surfaces 102, 104. At least one, but preferably a plurality of trenches 106 is formed and recessed in the upper spring shell 100 between the inner and outer surfaces 102, 104. Each trench 106 extends arcuately between a first end 108 and a second end 110. The trenches 106 are aligned end to end and arranged in a generally circular manner along the perimeter of the upper spring shell 100. A raised blocking wall 112, 114 extends diagonally between each of the pair of adjacent ends of the trenches 106 from the outer surface 102 to the second end 110 of each trench 106 for abutting with the trailing edge 54 of each respective tabs 48, 50 of the drive hub 40. Further, one of the blocking walls 112, 114 is arranged to overlay the clutch stop 85 to retain the stop 85 within the cavity 84 of the lower spring shell 70. The upper spring shell 100 further includes an axially extending alignment tab 115 extending diagonally between the inner surface 102 and outer surface 104. The alignment tab 115 is sized to be received within the retaining slot 82 to ensure correct orientation between the lower and upper spring shells 70, 100. A plurality of cutouts 116 is formed in the outer surface 104 to reduce the weight of the upper spring shell 100 and to form a series of alternating undulations 118, 120 in the outer surface 104. Additionally, a lubricant can be supported in the cutouts 116 for lubricating the inner clutch surface 26 of the output pulley 22. The undulations 118 each include a bore 122 therethrough aligned axial with a corresponding bore 92 in the lower spring shell 70 for receiving the fastener 94 to fixedly secure the lower spring shell 70 to the upper spring shell 100. The undulations 120 each include an axially projecting and slightly tapered tab 124 for aligning axially with a corresponding elongated slot 96 in the lower spring shell 70 and for providing a rigid connection to transmit torque between the lower spring shell 70 and the upper spring shell 100. Further, the upper spring shell 100 includes an enlarged counter-balance block 126 formed between the inner surface 102 and the outer surface 104 positioned radially opposite the retaining slot 82 and cavity 84 in the lower spring shell 70 to rotationally balance the lower and upper spring shells 70, 100.

The decoupler assembly 20 also includes a plurality of biasing members 130 in the form of helical coil springs. A biasing member 130 is supported in each of the radially and axially aligned trenches 76; 106 between the lower spring shell 70 and upper spring shell 100. Each biasing member 130 extends arcuately between first and second spring ends 132, 134. Approximately one-half of the first and second spring ends 132, 134 abuts the first and second ends 78, 80 of the trenches 76 in the lower spring shell 70 and the other one-half abuts the first and second ends 108, 110 of the trenches 106 in the upper spring shell 100. When the lower and upper spring shells 70, 100 are aligned axially and radially and pressed together, the biasing members 130 are seated in the corresponding trenches 76, 106 between the lower and upper spring shells 70, 100. The biasing members 130 may be preformed in an arcuate shaped corresponding to the arcuate shape of the trenches 76, 106 or may be straight and then bent into shape when seated within the trenches 76, 106. It should also be appreciated that the biasing members 130 may include any compressible or resilient member seated within the trenches 76, 106, such as a rubber strut type member or compressible fluid. Preferably, a lubricant, such as grease or oil, is disposed in the trenches 76, 106 to reduce friction between the biasing members 130 and the spring shells 70, 100. Generally, the lubricant also enhances damping characteristics of the decoupler assembly 20. The damping characteristics can be tuned for a particular application. That is, the damping characteristics can be decreased or increased, depending on the type of lubricant placed in the trenches 76, 106 and decoupler assembly 20.

A clutch element 140 is disposed adjacent the inner clutch surface 26 of the output pulley 22. More specifically, the clutch element 140 is a coil spring having a plurality of coils 142 extending helically between a proximal end 144 and distal end 146. The proximal end 144 of the clutch element 140 is fixedly held in the retaining slot 82 in the lower spring shell 70. The tip of the proximal end 144 of the clutch element 140 extends into the cavity 84 and abuts the clutch stop 85. The clutch element 140 is supported by the radial rim element 75 such that the ramped support surface 79 of the rim element 75 correspondingly mates with the contour of the helical coils 142. The coils 142 are outwardly frictionally engaged with the inner clutch surface 26, such that rotational acceleration of the drive hub 40 relative to the output pulley 22 in the driven direction of the crankshaft 16 causes the coils 142 to expand radially outwardly to couple the drive hub 40 and output pulley 22. The coils 142 grip the inner clutch surface 26 so that the output pulley 22 rotates with the drive hub 40. Conversely, deceleration of the drive hub 40 relative to the output pulley 22 causes the coils 142 to contract radially inwardly. The coils 142 release grip of the inner clutch surface 26 to allow the output pulley 22 to overrun the drive hub 40. Preferably, the coils 72 have a rectangular cross section.

Referring again to FIG. 2, the decoupler assembly 20 is assembled by seating the biasing members 130 in the trenches 76 of the lower spring shell 70. The clutch stop 85 is placed in the cavity 84. The clutch element 140 is positioned around the lower spring shell 70 and the proximal end 144 is recessed within the retaining slot 82 with the end thereof abutting the clutch stop 85. The clutch element 140 is supported by the radial rim element 75 such that the helical coils 142 mate with the helical contour of the ramped support surface 79 formed by the rim element 75. The drive hub 40 is then positioned in the center of the lower spring shell 70 such that the radial rim 45 is seated against the periphery around the inner surface 72 and the tabs 48, 50 are positioned between the adjacent ends of the trenches 76. Next, the upper spring shell 100 is aligned axially and radially with the lower spring shell 70 such that the biasing members 130 are seated in the trenches 106 and the tabs 48, 50 are similarly positioned between the adjacent ends of the trenches 106. The alignment tab 115 is arranged to be received within the retaining slot 82 to ensure proper orientation between the shells 70, 100 and to position the counter-balance blocks 98, 126 opposite the proximal end 144 of the clutch element 140. The counter-balance block 126 should be arranged generally 180 degrees opposite the proximal end 144 of the clutch element 140. The alignment tab 115 also engages and presses down on the proximal end 144 of the clutch element 140 to retain the end 144 within the retaining slot 82. The upper spring shell 100 is similarly seated within the circumference of the clutch element 140. The axially projecting and tapered tabs 124 are received within the corresponding slots 96 in the lower spring shell 70 to provide a rigid connection and transmit torque between the shells 70, 100. The upper and lower spring shells 70, 100 are fixedly connected by passing the fasteners 94 through each of the axially aligned bores 92, 122.

The bearing assembly 60 is press fit against the hub bearing surface 32 of the output pulley 22 and the seal 68 is pressed around the inner race 62 against the shoulder formed with the outer race 64 to seal the bearing assembly 60 and output pulley 22.

The drive hub 40, lower and upper spring shells 70, 100 and clutch element 140 are then positioned within the annular inner clutch surface 26 with the bearing post 46 of the drive hub 40 extending through the inner race 62 of the bearing assembly 60 to rotatably couple the drive hub 40 and output pulley 22. The clutch element 140 will be in slight frictional engagement with the inner clutch surface 26 and the outer bearing surface 77 of the radial rim element 75 frictionally engages and supports the inner clutch surface 26 of the output pulley 22.

The inner cavity of the output pulley 22 is filled with a lubricant, such as grease or oil as desired to reduce friction between the components and provide dampening. A disc-shaped cover plate 150 closes the output pulley 22 and covers the upper spring shell 100. Preferably, the cover plate 150 includes an inner seal 152 for sealing engagement against the main body 42 of the drive hub 40 and an outer peripheral gasket 154 for sealing against the output pulley 22, together providing a fluid tight sealed decoupler assembly 20. The cover plate 150 may be fixedly secured to the output pulley 22 by roll forming the periphery of a lip 156 on the output pulley 22 against the circumferential outer surface of the cover plate 150.

Figure 9:
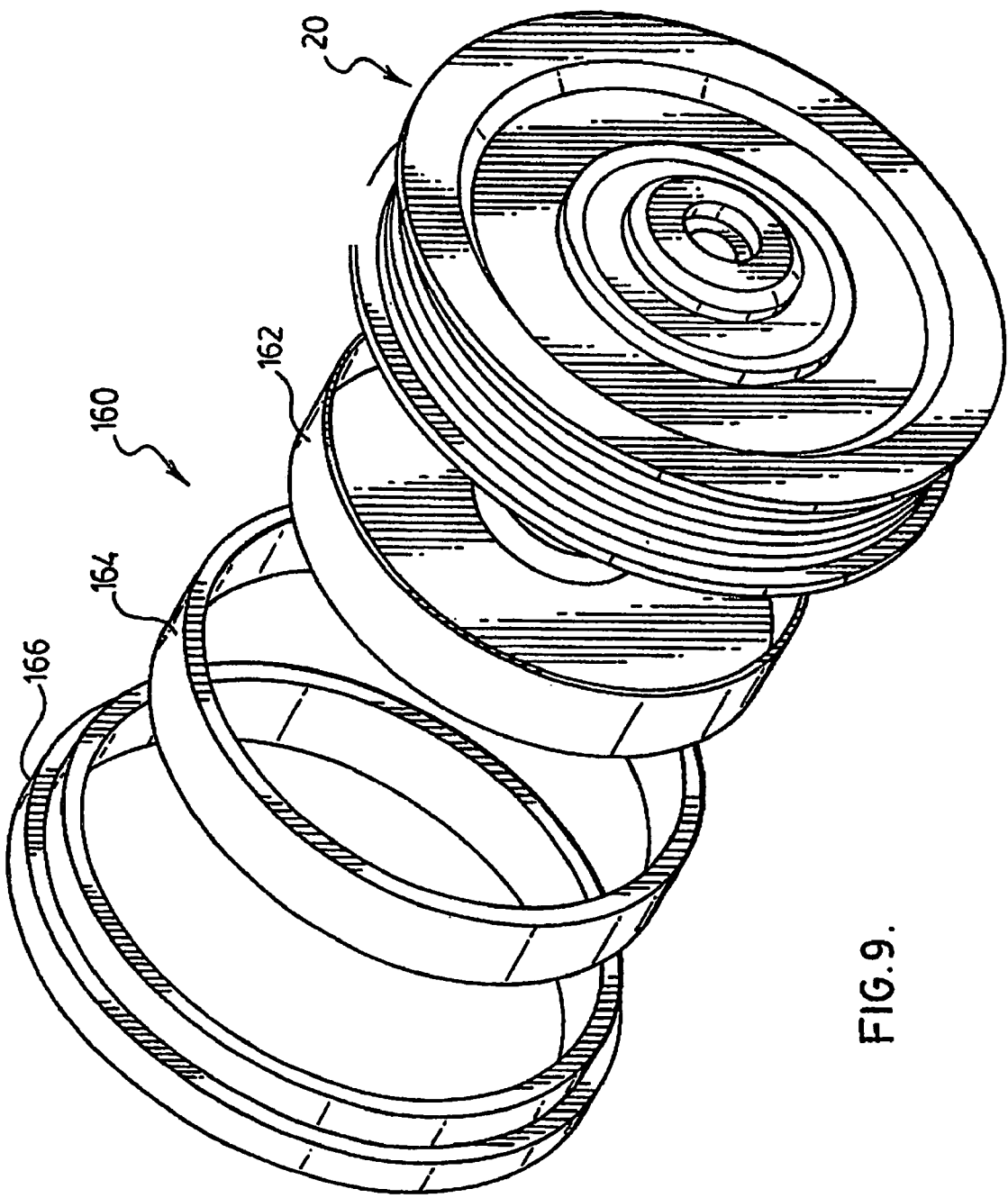
FIG. 9 is an exploded perspective view of the decoupler assembly with a torsional vibration damper.

Referring to FIG. 9, a torsional vibration damper 160, as known by those skilled in the art, may be fixedly secured to the hub 40 for dampening vibrations experienced at the crankshaft 16 during of the operation of the engine 10. The torsional vibration damper 160 of the preferred embodiment of FIG. 9 includes a damper mounting hub 162 mounted to the drive hub 40. An elastomeric ring 164 is secured to the damper mounting hub 162 by an inertia ring 166 to complete the assembly.

Figure 10:
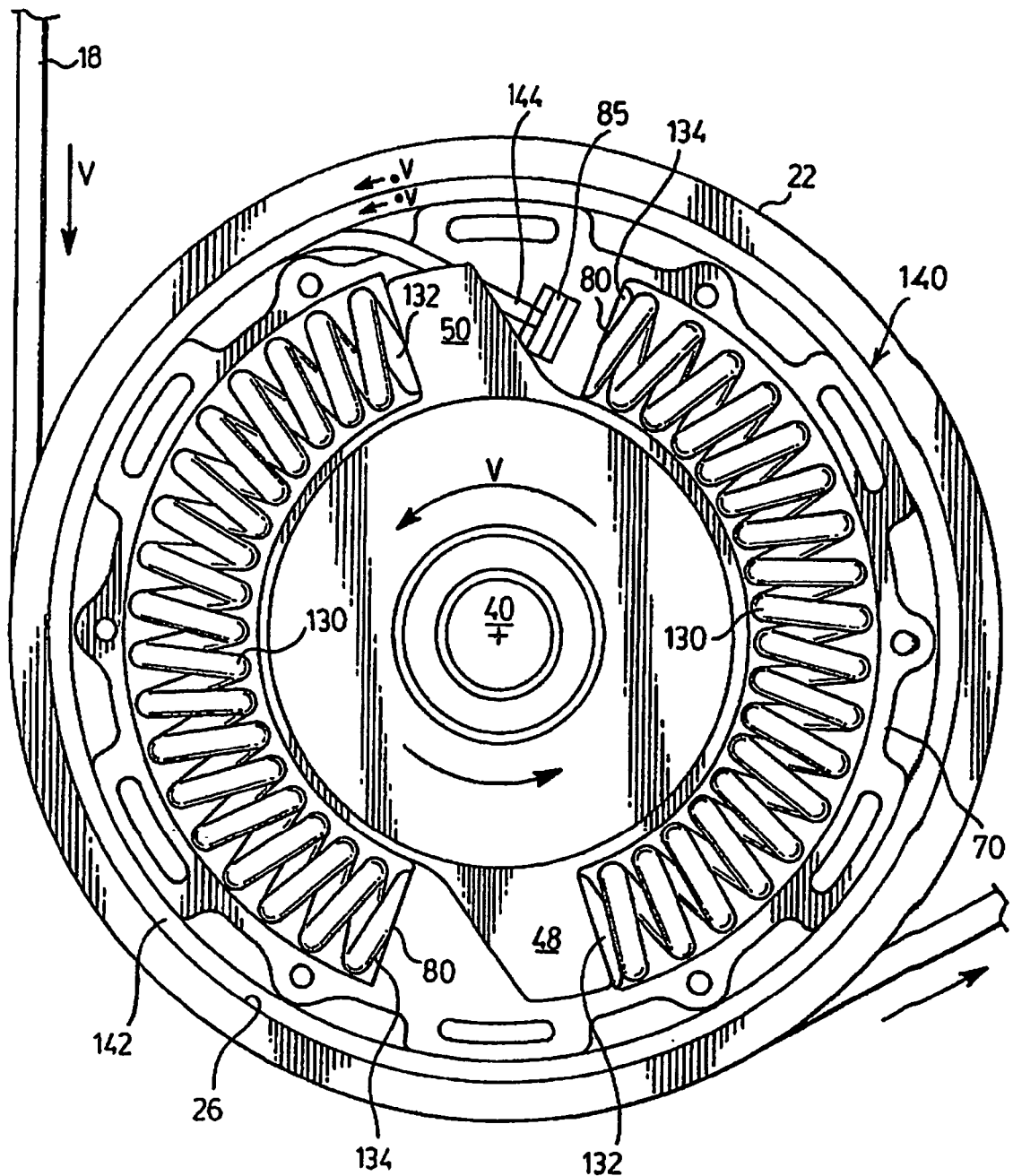
FIG. 10 is a plan view of the decoupler assembly accelerating for driving engagement of the output pulley.

Referring to FIGS. 2 and 10, in operation, the engine 10 rotatably accelerates or decelerates the crankshaft 16 and the drive hub 40 in the driven direction V relative to the output pulley 22. First, during normal acceleration, the tabs 48, 50 engage the first spring ends 132 of the biasing members 130. Initially, the first spring ends 132 are rotatably displaced relative to the respective second spring ends 134 as the biasing members 130 are compressed against the second ends 80, 110 of the trenches 76, 106. The amount of displacement of the second spring ends 134 during acceleration is directly proportional to the rate of acceleration of the drive hub 40 and the stiffness of the biasing members 130. Eventually, the upper and lower spring shells 70, 100, urged by the compressed biasing members 130, accelerate with the drive hub 40. That is, the transfer of torque or acceleration from the drive hub 40 to the upper and lower spring shells 70, 100 is slightly delayed during compression of the biasing members 130. Acceleration of the upper and lower spring shells 70, 100 relative to the output pulley 22 causes the coils 142 to expand radially outwardly toward the inner clutch surface 26. More specifically, the rotation of the lower spring shell 70 urges the blocking tab 85 against the proximal end 144 of the clutch element 140 to radially expand the coils 142 against the inner clutch surface 26. The contour of the retaining slot 82 in the lower spring shell 70 supports the proximal end 144 of the clutch element 140 to prevent localized bending of the coils 142 and urge uniform radial expansion along the entire length of the helical coils 142 against the inner clutch surface 26. The coils 142 grip the clutch surface 26 with sufficient friction so that the output pulley 22 rotates with the drive hub 40, driving the belt 18.

Referring to FIGS. 2 and 11, during rapid deceleration of the crankshaft 16 and drive hub 40, which may be caused by transmission shift, engine startup or shutdown, etc., it is desirable to selectively allow the output pulley 22 to rotate at a greater speed than the drive hub 40, or overrun the drive hub 40 and crankshaft 16 to prevent belt slip on the output pulley 22 causing belt squeal or noise. During such deceleration, the tabs 48, 50 decelerate to reduce the load or torque exerted on the first ends 132 of the biasing members 130. The biasing members 130 are allowed to extend or rebound against the tabs 48, 50 to thus also reduce the torque on the upper and lower spring shells 70, 100. The trailing edges 54 of the tabs 48, 50 engage the corresponding blocking walls 112, 114 on the upper spring shell 100 to maintain the acceleration of the spring shells 70, 100 with the acceleration of the hub 40. Deceleration of the spring shells 70, 100 relative to the output pulley 22 causes the coils 142 to contract radially inwardly with respect to the inner clutch surface 26. Contraction of the coils 142 allows the inner clutch surface 26 to slip relative to the clutch mechanism 140, thereby allowing the output pulley 22 to operate at a higher speed (V) than the drive hub 40 and crankshaft 16 (V−δ), or overrun the crankshaft 16 and prevent belt slippage on the output pulley 22 and noise in the assembly.

Additionally, during normal acceleration and deceleration of the crankshaft 16 as a result of the engine combustion process, higher frequency oscillatory torsional vibrations and high impact loads are generated within the crankshaft 16. The decoupler assembly 20 also decouples, dampens and mechanically isolates these torsional vibrations between the crankshaft 16 and the output pulley 20. Specifically, oscillatory torsional vibrations from the crankshaft 16 are dampened or isolated from the output pulley 22 by the biasing members 130. Oscillations of the crankshaft 16, and thus drive hub 40, act on the first ends 132 of the biasing members 130 to compress the biasing members 130 against the second ends 80, 110 of the trenches 76, 106. The biasing members 130, or arcuate coil springs, compress and expand continuously with the torsional oscillations of the drive hub 40 to dampen, isolate and absorb the vibration caused by the torsional oscillations. The biasing members 130 thus reduce the impact loads generated within the engine, which would normally be transferred through the crankshaft 16 and into the output pulley 22, and consequently directly into the belt driven accessory components. In other words, the biasing members 130 lower the oscillatory acceleration and deceleration rates and introduce a phase shift between the input force by the drive hub 40 and the output response at the output pulley 22. This phase shift manifest itself as a lowering of the system resonance. By lowering the resonance of the drive assembly, unwanted vibrations are attenuated and torsional displacements induced by a system resonance are eliminated, or avoided.

Thus, the decoupler assembly 20 allows the belt driven accessory components 12 to temporarily operate at a higher speed or "overrun" the crankshaft 16 as the rotational speed of the crankshaft 16 changes with the speed of the engine 10, which results in smoother engine operation, less noise, and increased belt life. The decoupler assembly 20 also dampens or isolates torsional vibrations experienced between the crankshaft 16 and the belt 18 during operation of the engine 10.

Although the decoupler assembly 20 is described above as part of an internal combustion engine, it should be appreciated that the decoupler assembly 20 can be implemented in any rotary or pulley-type belt drive system, such as a generator or a conveyer belt system, or in any system of rigid shafts with pulley or misalignment couplings where a hub load is not necessarily applied.

It should also be appreciated that the output pulley 22 can be adapted to accommodate any type of drive element, such as a plastic or rubber multi-rib belt, a "V" belt, or a synchronous belt. The output pulley 22 can also be adapted to accommodate other drive elements such as a steel flat belt, as used in a continuously variable transmission, for example, or a multi-link chain made of plastic or steel.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A decoupler assembly for transferring rotational torque between a drive shaft and an endless drive element of an automotive engine, said decoupler assembly comprising:

a drive hub configured to be fixedly secured to the drive shaft;

a pulley rotatably mounted on said drive hub and adapted to be drivingly engaged with the endless drive element;

a spring shell operatively coupled between said drive hub and said pulley for selective rotation therewith, said spring shell having a radial rim element, said radial rim element frictionally engaging and supporting said pulley;

at least a pair of biasing members elastically coupling said spring shell and said drive hub isolating oscillatory vibrations therebetween; and a clutch element seated between said spring shell and said pulley selectively transferring rotational torque from said drive hub to said pulley and enabling overrunning of the pulley relative to said drive hub, wherein said clutch element includes a plurality of helical coils in frictional engagement with said pulley and an end coupled to said spring shell, said clutch element expanding against said pulley upon driving rotation of said drive hub relative to said spring shell selectively coupling said drive hub and said pulley, wherein said radial rim element has a helical contour corresponding to and supporting said helical coils of said clutch element.

2. A decoupler assembly as set forth in claim 1 wherein said radial rim element includes an outer peripheral bearing surface for frictionally engaging and supporting said pulley, and said radial rim element increases in its axial thickness incrementally and continuously forming a ramped support surface for supporting said helical coils of said clutch element and defining said helical contour corresponding to said helical coils.

3. A decoupler assembly as set forth in claim 1 wherein said spring shell is molded from an organic plastic material.

4. A decoupler assembly as set forth in claim 1 further comprising lubricant contained within said spring shell.

5. A decoupler assembly as set forth in claim 1 wherein said pulley includes an inner clutch surface for frictional engagement with said coils upon rotation of said spring shell with said drive hub to selectively transfer torque between said drive hub and said pulley.

6. A decoupler assembly as set forth in claim 1 wherein said spring shell includes a lower spring shell fixedly secured to an upper spring shell for supporting one of said biasing members therebetween.

7. A decoupler assembly as set forth in claim 6 wherein each of said lower and upper spring shells including a pair of said trenches for supporting one of said biasing members therein between said lower and upper spring shells.

8. A decoupler assembly as set forth in claim 7 wherein each of said lower and upper spring shells includes a cylindrical inner surface for rotationally supporting said drive hub and a cylindrical outer surface seated concentrically within said clutch element.

9. A decoupler assembly as set forth in claim 8 wherein said biasing member extends arcuately between a first end and a second end and said trenches extend arcuately between a first end and a second end for correspondingly abutting said first and second ends of said biasing members therebetween.

10. A decoupler assembly as set forth in claim 9 wherein said drive hub includes a main body configured to be fixedly secured to the drive shaft and cylindrical rim extending radially from said main body and rotatably supported by said inner surfaces between said lower and upper spring shells.

11. A decoupler assembly as set forth in claim 10 wherein said drive hub includes a pair of diametrically opposing tabs projecting radially from said rim and seated between adjacent ends of said trenches.

12. A decoupler assembly as set forth in claim 11 wherein each of said tabs of said drive hub includes a leading edge for engaging said first end of said biasing members to compress said biasing member in said trench and isolate oscillatory vibrations between said drive hub and said pulley from rotation of the drive shaft.

13. A decoupler assembly as set forth in claim 12 wherein each of said tabs of said drive hub includes a trailing edge opposite said leading edge for engaging a portion of at least of one said lower and upper spring shells to control rotation of said spring shells with said drive hub.

14. A decoupler assembly as set forth in claim 13 wherein one of said lower and upper spring shells includes a retaining slot for receiving and retaining said end of said clutch member.

15. A decoupler assembly as set forth in claim 14 wherein said pulley includes an annular outer track concentric with said annular inner clutch surface and adapted to support the belt, a face plate supporting said outer track and said inner clutch surface, and a cylindrical hub projecting axially from the center of said face plate and defining a hub bearing surface.

16. A decoupler assembly as set forth in claim 15 wherein said drive hub includes a cylindrical bearing post extending axially from the center of said main body and seated within said cylindrical hub of said pulley.

17. A decoupler assembly as set forth in claim 16 further including a bearing assembly pressed between said bearing post and said hub bearing surface of said pulley for rotatably coupling said drive hub and said pulley.

18. A decoupler assembly as set forth in claim 17 wherein said lower spring shell includes a cavity formed adjacent said retaining slot for supporting a clutch stop, said clutch stop engaging said end of said clutch element to elastically expand said coils against said inner clutch surface of said pulley when said rotational torque is transferred from said drive hub to said pulley.

19. A decoupler assembly as set forth in claim 18 wherein said at least one of said upper and lower spring shell includes a counter-balance block formed between said inner and outer surface radially opposite said retaining slot for balancing the rotation of said spring shell.

20. A decoupler assembly as set forth in claim 19 wherein said lower spring shell includes a plurality of elongated slots formed therein between said inner and outer surface and said upper spring shell includes a plurality of tapered tabs projecting axially therefrom between said inner and outer surface for engagement with said slots in said lower spring shell to align and transfer rotational torque between said lower and upper spring shells.

21. A decoupler assembly as set forth in claim 20 further including a disc-shaped seal seated within said hub bearing surface of said pulley for sealing said pulley and said bearing assembly.

22. A decoupler assembly as set forth in claim 21 further including a cover plate having an inner seal for engaging and sealing against said drive hub and an outer gasket for sealing against said pulley opposite said disc-shaped seal and maintaining a lubricant within said assembly.

* * * * *